United States Patent [19]
Smith

[11] 4,288,188
[45] Sep. 8, 1981

[54] TIE DOWN
[75] Inventor: Edward R. Smith, Denville, N.J.
[73] Assignee: Patent Products, Inc., East Hanover, N.J.
[21] Appl. No.: 936,526
[22] Filed: Aug. 24, 1978
[51] Int. Cl.³ .......................... B60R 7/00; A44B 31/00
[52] U.S. Cl. ........................................ 410/97; 294/74; 248/499; 296/40
[58] Field of Search ............... 410/85, 97, 112, 10, 410/11, 21, 23; 296/40; 224/318, 329, 42.46 R; 248/499; 294/74

[56]  References Cited
U.S. PATENT DOCUMENTS

| 1,934,165 | 11/1933 | Butterworth | 410/21 |
| 3,436,114 | 4/1969 | Lang et al. | 294/74 |
| 4,058,049 | 11/1977 | Bech | 294/74 |
| 4,108,342 | 8/1978 | Riva | 248/499 |
| 4,171,840 | 10/1979 | Berzenye | 294/74 |

Primary Examiner—Richard A. Bertsch
Attorney, Agent, or Firm—Kenyon & Kenyon

[57] ABSTRACT

The tie down is constructed of a flexible metal cable with a loop at one end and a bore at the opposite end to receive a screw for anchoring the tie down to the frame of an automobile. The entire surface of the tie down is coated with a plastic coating to prevent marring of the adjacent surfaces of the automobile. A plurality of tie downs are used to anchor luggage, boats, and the like on the roof of an automobile. The tie down can be anchored in a rain gutter of the automobile frame so as to pivot from a concealed location to an exposed location ready for use.

12 Claims, 7 Drawing Figures

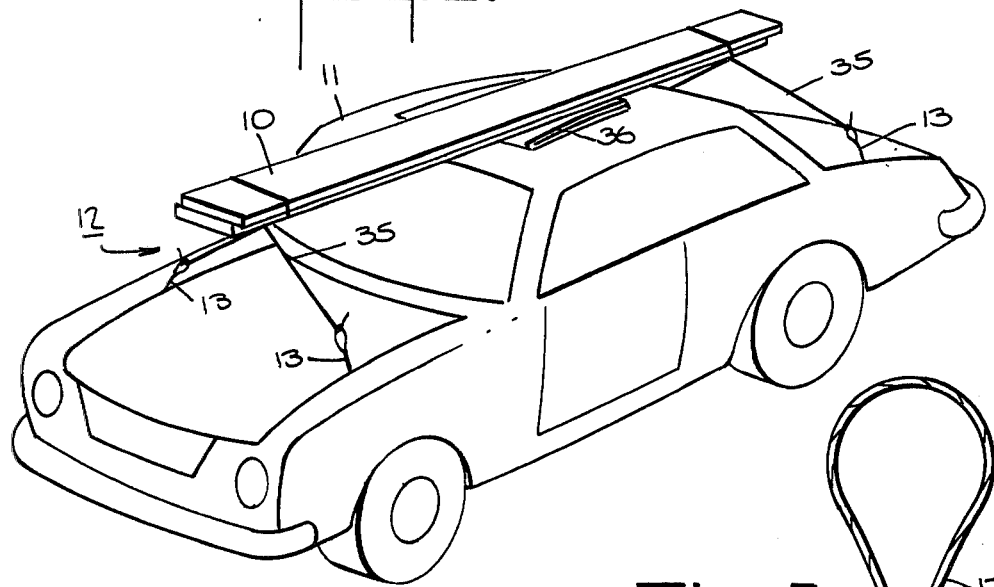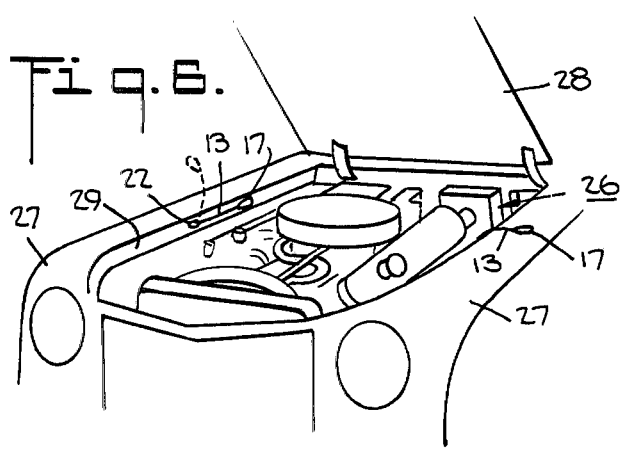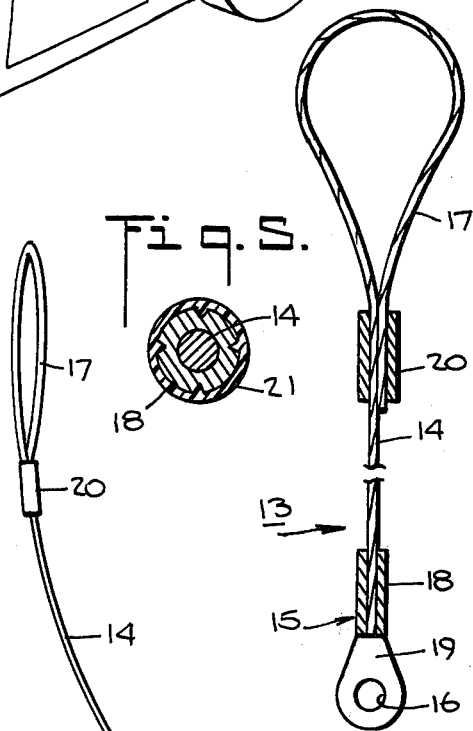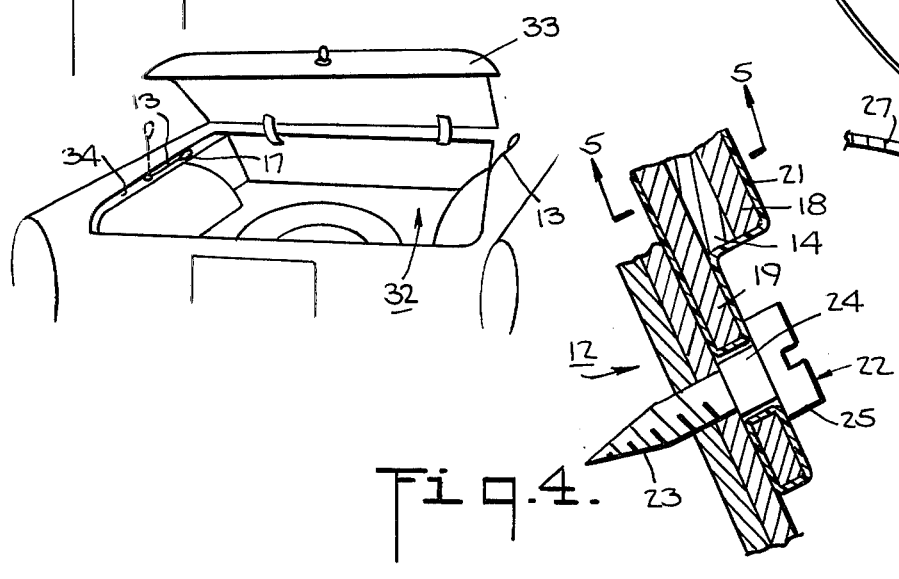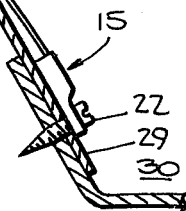

TIE DOWN

The invention relates to a tie down and to a tie down system for securing articles on a vehicle, such as an automobile.

Heretofore, in order to secure articles such as boats, furniture, luggage, lumber and the like on a roof of an automobile for transport purposes, it has been known to use ropes or cables. Usually, the ropes are looped about the articles and tied to the automobile frame in some fashion. In some cases, in order to insure against any slippage of the articles from the automobile during travel, the ropes have been secured with several knots to the automobile. This, however, is a time consuming task not only when tieing down the articles but also when the articles are to be removed at the point of destination. In some instances, in order to avoid unknotting, the ropes are simply severed so that the articles can be removed. This not only results in a waste of rope, but also still requires a subsequent removal of the rope pieces about the automobile frame, or bumper. Further, since the ropes are usually anchored directly to the grille or body of the automobile, there is a risk of damage to the finish of the automobile.

Further, it is frequently difficult to anchor a rope to a suitable point in the frame of an automobile, such as a sedan, in a simple convenient manner. For example, a rope might have to extend through a passenger compartment from one side to the other in order to hold an article in place on the roof. In other cases, the rope might be tied to a door frame in such a way as to preclude easy opening and closing of the door.

Still further, if a rope or the like is to be frequently used for securing articles in place on an automobile, it becomes necessary to have the rope available when needed. This requires storage of the rope in a suitable place; usually in a trunk of the automobile.

Accordingly, it is an object of this invention to provide a relatively simple tie down for securing articles in place on a vehicle.

It is another object of the invention to provide a tie down which can be mounted on a vehicle in a permanent manner.

It is another object of the invention to provide a tie down system for an automobile which can be located at suitable locations of the automobile.

It is another object of the invention to provide a tie down for a vehicle which is concealed when not in use.

Briefly, the invention provides a tie down which is comprised of a flexible strand of limited length, means at one end of the strand to define a bore, and a loop at the opposite end of the strand. The flexible strand is formed, for example, of a metal cable and is of sufficient tensile strength to resist a tensile loading. The bore is sized to receive a fastening element so that the tie down can be permanently anchored in a given location on a support, such as an automobile fender; and the loop is sized to receive a loop of cord, rope, cable or the like secured to an article which is to be anchored to the support.

In addition, the entire tie-down is provided with a plastic cover which serves to protect the tie down against the elements as well as to protect the surfaces of the support against scratching, marring, or other like damage by the tie down.

When used in a tie down assembly for an automobile, a plurality of tie downs are fastened at suitable locations on the body of the automobile. For example, the tie downs can be located at four locations about the automobile body, two at the front and two at the rear. One pair of tie downs can be mounted on the side walls of the engine compartment of the automobile while the second pair of tie downs is mounted to the inside of the trunk of the automobile. Mounting may be such that when the tie downs are not in use they are received in concealed locations in the automobile frame.

After being mounted in place on the automobile, the tie down can be pivoted about the mounting screw into a recessed position within the automobile frame. When needed for use, the tie down can be pivoted upwardly and exposed for anchoring purposes.

When an article is mounted on the roof of a vehicle, any suitable type of rope, cable or the like can be looped about the article and thereafter secured to the loops of each pair of tie downs. Alternatively, any suitable type of tie arrangement can be used to fasten the rope to the loop of a tie down.

The coating which is used on the tie down is of any suitable type to avoid chipping of the finish of the automobile when the tie down is bent, particularly, when the tie down is used in cold weather.

These and other objects and advantages of the invention will become more apparent from the following detailed description taken in conjunction with the accompanying drawings wherein.

FIG. 1 illustrates a prospective view of an automobile utilizing a tie down system in accordance with the invention;

FIG. 2 illustrates a partial fragmentary cross-sectional view of a tie down in accordance with the invention;

FIG. 3 illustrates a view of a mounted tie down in accordance with the invention;

FIG. 4 illustrates a cross-sectional view of the anchored end of a tie down in accordance with the invention;

FIG. 5 illustrates a view taken on line 5—5 of FIG. 4;

FIG. 6 illustrates a mounting of a pair of tie downs in accordance with the invention within an automobile body; and FIG. 7 illustrates a pair of tie downs mounted at the rear of an automobile in a rain gutter.

Referring to FIG. 1, the tie down system for securing various items, such as boards 10 to the roof 11 of a vehicle such as an automobile 12 employs a plurality of tie downs 13 (e.g. four). The tie downs 13 are disposed in pairs at the front and rear of the automobile 12 and are fixedly mounted in place.

Referring to FIG. 2, each tie down 13 is comprised of a flexible strand 14 such as a metal cable of limited length, a means such as a ferrule 15 at one end of the strand 14 to define a bore 16, and a loop 17 at the opposite end of the strand 14.

The ferrule 15, as shown, has a split sleeve portion 18 which envelops the strand 14 and is compressed about the strand 14 in a locking fit relationship. In addition, the ferrule 15 has a flat spade-like portion 19 which extends from the sleeve portion 18 and contains the bore 16.

In order to form the loop 17, the end of the strand 14 is looped over onto an intermediate portion of the strand 14 and a clamp 20 is secured about the overlapped portions. The clamp 20 is of any suitable type, such as a split sleeve which is compressed about the strand portions.

In addition, as indicated in FIG. 4, the entire exterior surface of the tie down 13 is coated with a plastic coating 21. The plastic may be of any suitable type, such as a vinyl plastic which remains relatively soft under cold temperatures, so as to avoid chipping, scratching, or other marring of the automobile 12.

Referring to FIG. 4, each tie down 13 is secured in place by means of a fastening element, such as a screw 22, which passes through the bore 16 in the ferrule 15. As illustrated, the screw 22 is provided with a threaded portion 23 for engaging in the body of the automobile 12, a smooth shouldered portion 24 which is disposed concentrically within the bore 16 of the ferrule 15 and an enlarged head 25. In this way, the tie down 13 is able to swivel or pivot about the shouldered portion 24 of the screw 22 while being anchored to the automobile body.

Referring to FIG. 6, where the automobile 12 is of the type having an engine compartment 26 located between two fenders 27 and a pivotal hood 28 for closing over the engine compartment, the tie downs 13 at the front of the automobile 12 can be anchored to the sidewalls 29 of the engine compartment 26. For example, the screws 22 are located at points along the sidewalls 29 where two or more pieces of metal join (FIG. 3). Where the automobile 12 has a seam 30 between a fender 27 and a wheel well 31 (FIG. 3), the screws 22 are each positioned in the seam 30 so that the tie down 13 can be disposed within the seam 31 when not in use. Thus, when the hood 28 is closed, the tie downs 13 can be hidden from view. However, when needed, each tie down 13 can be extracted from between the hood 29 and a fender 27 by pivoting about the anchoring screw 22.

The pair of tie downs 13 located at the rear of the automobile 12 may be secured in a similar fashion. For example, where the automobile 12 has a trunk 32 and a trunk lid 33 for closing over the trunk 32 adjacent to conventionally placed rain gutters 34, the anchoring screws 22 can be threaded into the side walls of the trunk within the rain gutters 34. In this case, the screws 22 can be located in the recesses into which the trunk lid 33 is positioned on closing. In a case of a station wagon, the tie downs 13 at the rear can be fastened inside a tail gate area to be out of view when not in use.

Referring to FIG. 1, the boards 10 can be tied down by means of ropes or nylon type cords 35 which are looped about the boards 10 and secured at the ends to the pairs of tie downs 13 at each end of the automobile 12. For example each end of the cord 35 can be knotted about a loop 17 or can be simply threaded through the loop 17 and knotted to itself.

If long material is being carried, a suitable pad 36 (FIG. 1) can be placed on the roof 11 of the automobile 10 under the material. The material can then be tied to the pairs of tie downs 13 at the ends of the automobile. Alternatively, long material, such as molding or pipe, can be secured along one side of the automobile 10 using only one front and one rear tie down. When carrying articles such as boats, canoes and the like, the tie downs 13 should be placed so that the tension at each end of the load is in opposing directions to preclude sliding of the article.

The strand from which the tie down is made can be a 1/16 inch stranded galvanized aircraft grade cable having a tensile strength of over 350 pounds. In this regard, the tie down 13 is constructed to have sufficient strength and tension to securely hold materials in place on an automobile or other suitable vehicle.

It is further noted that the flexibility of the tie down is such that the strand is self-supporting. That is, the strand is not in the nature of a string which would collapse upon itself. The flexibility is of a nature such that a tie down retains its shape and configuration but can be flexed into a suitable position to secure the articles being transported.

While the tie down 13 has been described for use in a conventional sedan-type automobile, it is noted that the tie down 13 can be used in any type vehicle such as station wagons; rear-mounted engine vehicles; trucks; trailers; and the like.

The invention provides a tie down which can be easily anchored in place and can be readily moved from a recessed storage position to an exposed use position. Since the tie down is self-supporting, the tie down will remain in an unflexed position when stored, for example, in a rain gutter or seam alongside an engine compartment and will be precluded from loosely falling into the engine compartment. Also, because the tie down can be secured directly to the fender joints of an automobile, relatively high tension forces can be transmitted.

The tie down can be made with a length which is suitable for use in an automobile, for example, an eight inch length, or can be made of other lengths for other environments in which the tie down is useful.

What is claimed is:

1. A tie down comprising
    a self-supporting flexible strand of limited length
    a ferrule at one end of said strand defining a bore for anchoring said strand to a support; in a pivotal relation
    a loop at the opposite end of said strand; and
    a plastic cover covering said strand, said loop and said ferrule.

2. A tie down as set forth in claim 1 wherein said strand is a metal cable.

3. A tie down as set forth in claim 1 wherein said strand has a tensile strength of at least 350 pounds.

4. A tie down comprising
    a self-supporting flexible metal cable of limited length having one end looped over onto an intermediate portion of said cable to define a loop;
    a clamp securing said one end of said cable to said intermediate portion;
    a ferrule secured to said cable at an opposite end from said loop, said ferrule having a bore passing therethrough on an axis perpendicular to the axis of said cable; and
    a plastic coating covering said cable, clamp and ferrule.

5. A tie down as set forth in claim 4 wherein said loop is disposed perpendicularly of said bore.

6. A tie down as set forth in claim 4 wherein said cable is of a length of about eight inches.

7. In combination with a vehicle having a support therein;
    a tie down having a self-supporting flexible strand of limited length; means at one end of said strand defining a bore; and a loop at an opposite end of said strand; and
    a fastening means passing through said bore into said support to anchor said strand to said support in pivotal relation.

8. The combination as set forth in claim 7 wherein said strand is a metal cable.

9. The combination as set forth in claim 7 which further comprises a soft cover covering said strand, said means, said fastening means and said loop.

10. The combination as set forth in claim 9 wherein said cover is a plastic coating.

11. The combination as set forth in claim 9 wherein said loop is disposed perpendicularly of said bore.

12. The combination as set forth in claim 7 wherein said support is an automobile fender having a rain gutter and said fastening means is a screw positioned within said fender to permit pivoting of said strand from a concealed location within said rain gutter to an exposed location.

* * * * *